April 23, 1940.  H. C. EDWARDS  2,198,574
SHAFT COUPLING
Filed Dec. 30, 1937  2 Sheets-Sheet 1
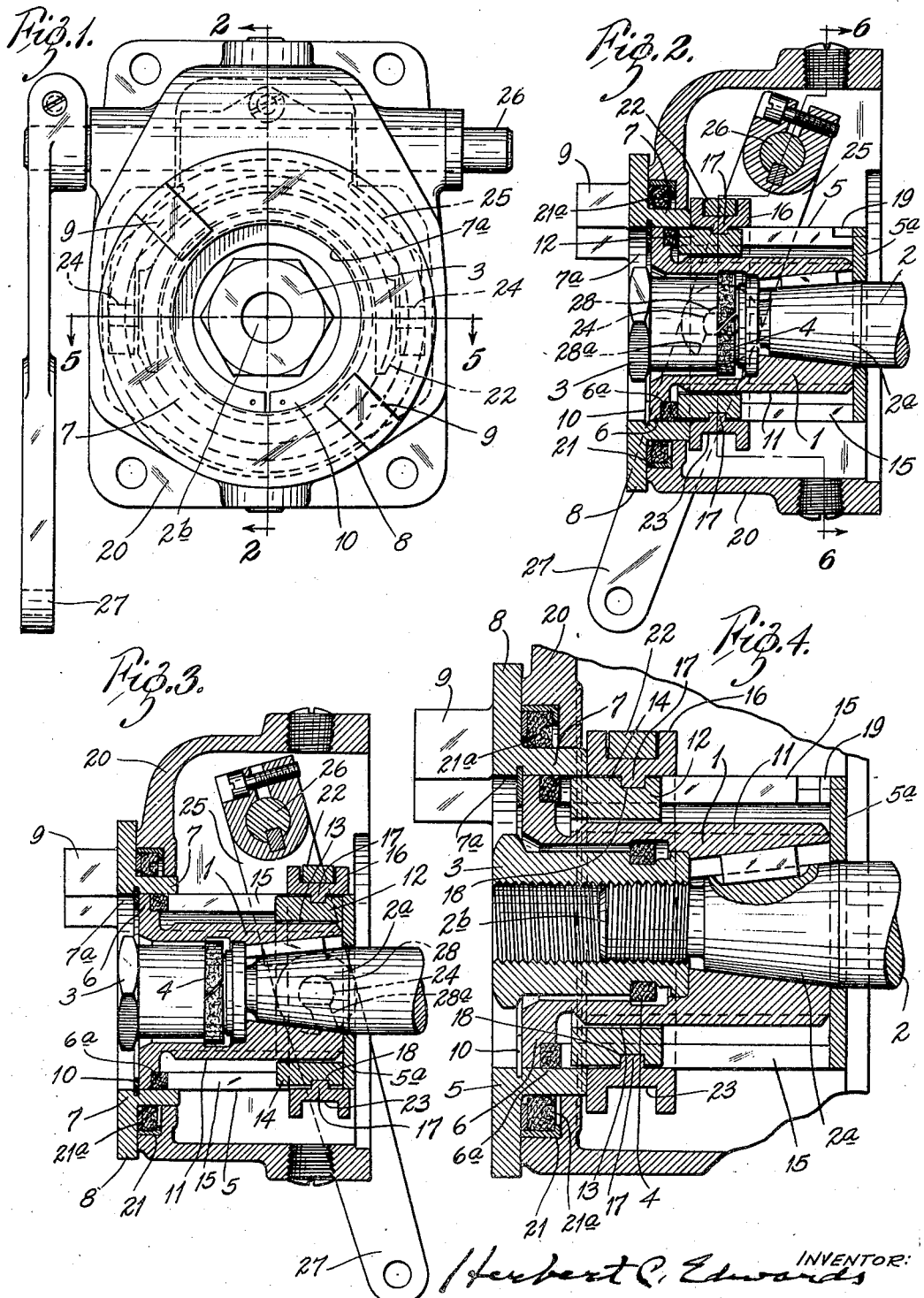

April 23, 1940. H. C. EDWARDS 2,198,574
SHAFT COUPLING
Filed Dec. 30, 1937 2 Sheets-Sheet 2
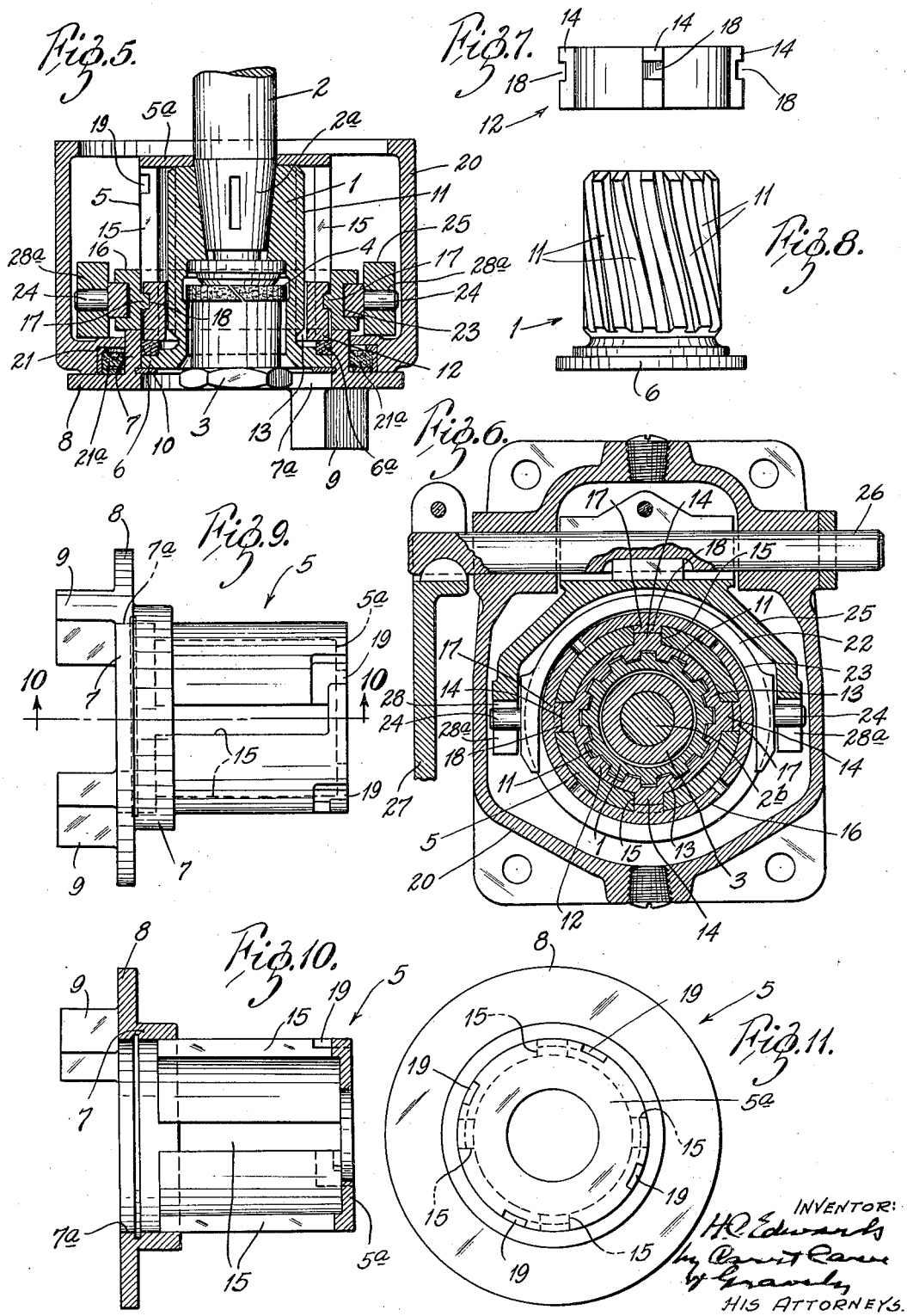

Patented Apr. 23, 1940

2,198,574

UNITED STATES PATENT OFFICE 2,198,574

SHAFT COUPLING

Herbert C. Edwards, Massillon, Ohio, assignor to The Timken Roller Bearing Company, Canton, Ohio, a corporation of Ohio Application December 30, 1937, Serial No. 182,447

11 Claims. (Cl. 64—24)

This invention relates to couplings of the kind used for transmitting motion from one rotary element to the other and for circumferentially adjusting one of said elements with respect to the other element during rotation.

The principal object of the present invention is to devise a strong and durable coupling of simple, economical and compact construction. The invention consists in the coupling and in the construction, combinations and arrangements of parts hereinafter described and claimed.

In the accompanying drawings, which form part of this specification and wherein like symbols refer to like parts wherever they occur:

Fig. 1 is an end elevation of an angularly adjustable rotary shaft coupling embodying my invention, Fig. 2 is a vertical central longitudinal section through said coupling on the line 2—2 of Fig. 1, showing the follower ring at one end of its sliding movement, Fig. 3 is a view similar to Fig. 2, showing the follower ring at the other end of its sliding movement, Fig. 4 is an enlarged fragmentary section similar to Fig. 2, Fig. 5 is a horizontal central longitudinal section on the line 5—5 of Fig. 1, Fig. 6 is a vertical transverse section on the line 6—6 of Fig. 2, Fig. 7 is a side elevation of the follower ring, Fig. 8 is a side elevation of the driving sleeve, Fig. 9 is a side elevation of the coupling sleeve, Fig. 10 is a central longitudinal section through the coupling sleeve on the line 10—10 of Fig. 9, and Fig. 11 is a view looking at the shaft receiving end of said coupling sleeve.

Referring to the accompanying drawings, my shaft coupling comprises a cylindrical driven sleeve 1 having one end supported on and keyed or otherwise non-rotatably secured to a tapered seat 2a provided therefor inwardly of the reduced threaded end 2b of the cam shaft 2 of a fuel injection pump. At its other or outer end, the axial bore of the driven sleeve 1 is enlarged or counterbored to accommodate a sleeve nut 3, which is threaded on the threaded end 2b of the cam shaft 2 in abutting relation to an annular shoulder formed in said bore by the counterbored portion thereof. Seated in a circumferential groove provided therefor in the nut 3 is an annular oil seal or oil retaining ring 4 which contacts with the counterbored portion of the axial bore of the driven sleeve 1.

Surrounding the driven sleeve 1 is a cylindrical driving or coupling sleeve 5 having an inner end wall 5a that overlaps the corresponding end of said driving sleeve and is provided with an axial opening through which the cam shaft 2 extends. At the outer end of the driven sleeve 1 the axial bore thereof is counterbored to accommodate the enlarged, flat-sided wrench receiving outer end portion of the nut 3. The outer end of the driven sleeve 1 also has an outstanding circumferential flange 6 thereon; and the outer end portion of the driving or coupling sleeve 5 is enlarged, as at 7, and counterbored to receive said flange and it also has an outstanding circumferential flange 8 having dogs or lugs 9 thereon to cooperate with and to be driven by corresponding portions of another coupling sleeve (not shown). The flange 6 at the outer end of the driven sleeve 1 is held between the annular shoulder formed by the counterbored outer end portion thereof and a split snap ring 10, which seats in an annular groove provided therefor in said counterbore in overlapped relation with said flange. The rear corner of the flange 6 of the driven sleeve is shouldered to fit within the smaller diameter of the bore of the coupling sleeve 5; and the remaining portion of said driven sleeve is further reduced in diameter to provide an annular clearance space between said portion and the bore of said coupling sleeve. This portion of the driven sleeve 1 is provided with a series of circumferentially spaced external ribs or teeth 11 that are disposed at an oblique angle to the axis of said sleeve.

Mounted for axial sliding movement in the coupling between the inner or driven sleeve 1 and the outer or coupling sleeve 5 is a relatively short sleeve or follower ring 12 having circumferentially spaced internal ribs or teeth 13 that are disposed at an oblique angle corresponding to the angle of the external teeth 11 on the driven sleeve and fit within the spaces between said last mentioned teeth. This follower ring 12 is provided on its outer periphery with a plurality, preferably four, equally spaced ribs 14 that extend from end to end of said ring parallel with the axis thereof. These lugs are slidably supported or guided in elongated slots 15 in the cylindrical wall of the coupling sleeve 5 that extends parallel with the axis of said sleeve from the inner end wall 5a thereof to the enlarged front end 7 thereof where they open into the enlarged portion 7a of the bore of said sleeve. This lug-and-slot connection between the follower ring 12 and the coupling sleeve 5 permits relative axial sliding movement of said ring and said sleeve, but prevents relative rotary movement thereof, while the cooperating helical ribs and groove of said follower ring and the driven sleeve 1 produce relative circumferential movement thereof during said axial sliding movement of said ring.

Mounted on the coupling sleeve 5 for sliding movement axially thereof is an operating ring 16 that has four circumferentially spaced lugs 17 in the bore thereof adapted to seat within circumferential grooves 18 provided therefor in the peripheral faces of the external lugs or ribs 14 on the follower ring 12. The outer periphery of the coupling sleeve is provided at its inner end with four circumferentially spaced grooves 19, each groove extending forwardly from said end of said sleeve adjacent to one of the longitudinal guide slots 15 therein and thence circumferentially to the adjacent edge of said slot. These angular grooves 19 are of a depth corresponding to the depth of the internal lugs 17 of the operating ring 16, whereby said ring, after being rotated far enough to engage or disengage its internal lugs from the circumferential grooves 18 in the external ribs 14 of the follower ring 12, may be slipped on or off the inner end of said coupling sleeve by passing said lugs of said operating ring through said angular grooves.

The coupling is preferably enclosed within a housing 20, the inner end of which is adapted to be secured flatwise to the adjacent end of the pump housing (not shown) for the cam shaft 2. The outer end of the coupling housing 20 has an opening 21 therein through which the coupling may be inserted and removed; this opening being closed by the outstanding flange 8 of the coupling sleeve 5 in the operative position thereof. The outer end of the opening 21 is counterbored to receive a suitable oil sealing ring 21a which snugly fits the enlarged portion 7 of the coupling sleeve 5. The rear face of the flange 6 of the driven sleeve 1 is shouldered to provide an annular seat for an oil sealing ring 6a which snugly fits the counterbored outer end portion of the coupling sleeve 5.

The operating ring 16 is straddled by a stirrup 22, which seats within the upper half of a circumferential groove 23 provided therefor in the outer periphery of said ring. The depending branches of said stirrup are provided with axially alined outstanding trunnions 24. This stirrup is straddled by an operating fork 25 that is supported in the coupling housing 20 for vertical swinging movement longitudinally of the coupling on a rock shaft 26 that is located above said coupling and extends transversely thereof with its ends journaled in suitable bearings provided therefor in the side walls of said housing. One end of the rock shaft 26 extends outside of the housing 20 and has an operating arm 27 rigidly secured thereto. The depending arms of the operating fork 25 are provided with bearings 28 adapted to rotatably receive the trunnions 24 of the stirrup 22; and said trunnions are adapted to be inserted in and removed from said bearings through openings 28a that lead upwardly from the lower ends of said arms to said bearings.

By the arrangement described, the rotary motion of the coupling sleeve 5 is transmitted to the cam shaft 2 through the follower ring 12 and driven sleeve 1 in any position of the axial sliding movement of said ring. When it is desired to advance or retard the cam shaft with respect to the coupling sleeve 5, the operating arm 27 is actuated to move the follower ring 12 axially of the coupling. As no relative rotary movement of the follower ring and coupling sleeve is permitted during the axial movement of said ring due to the longitudinal rib-and-slot connections between said sleeve and said ring, the driven sleeve 1 which is rigid with the cam shaft 2, is rotated relative to the coupling sleeve and the follower ring by reason of the oblique or helical rib-and-groove connections between said ring and said driving sleeve, thereby advancing or retarding the driven cam shaft with respect to the coupling sleeve, depending on the direction of axial sliding movement of said ring.

The hereinbefore described coupling has several advantages. The rotating coupling may be readily adjusted to change the timing of the cam shaft, and the parts of the coupling may be quickly and easily assembled and disassembled. The follower ring is comparatively short, and the guide slots therefor are comparatively long, whereby a greater relative angular adjustment of the driving and driven elements may be obtained for a given length of coupling. The four cooperating lug-and-slot connections between the follower ring and the coupling sleeve serve to increase the surface contact therebetween and thus increase the torsional strength of the coupling.

The above coupling is designed particularly for use in changing the timing of the cam shaft of a fuel injection pump for Diesel engines to advance or retard the time at which the fuel injection commences; but it is also adapted for use with other devices wherein it is desired to advance or retard the driven element with respect to the driving element.

What I claim is:

1. A rotary angularly adjustable coupling comprising two concentric sleeves and an axially slidable annular member interposed between said sleeves and operatively connected therewith to transmit rotary motion therebetween in all positions of its axial sliding movement, said annular member having a connection with one of said sleeves permitting relative axial movement but preventing relative rotary movement of said annular member and said sleeve, and a connection with the other of said sleeves adapted to cause relative rotation of said other sleeve and said annular member when the latter is moved axially and means independent of the torque being transmitted for imparting such axial movement to said annular member, said means comprising a member slidable axially of said sleeves and operatively connected to said annular member.

2. A rotary angularly adjustable coupling comprising two concentric inner and outer sleeves and an annular member interposed between and slidable axially of said sleeves and operatively connected therewith to transmit rotary motion therebetween in all positions of its axial sliding movement, said annular member having a connection with the outer sleeve preventing relative rotary movement of said annular member and said outer sleeve, and a connection with the inner sleeve around the entire circumference thereof adapted to rotate said inner sleeve in said annular member when the latter is moved axially and means independent of the torque being transmitted for imparting such axial movement to said annular member, said means comprising a member mounted for axial sliding movement on said outer sleeve and operatively connected with said annular member.

3. A rotary angularly adjustable coupling comprising inner and outer sleeves and an annular member interposed between and slidable axially of said sleeves and operatively connected therewith to transmit rotary motion therebetween in all positions of its axial sliding movement, said annular member having a rib-and-slot connection with one of said sleeves permitting relative axial movement but preventing relative rotary movement of said sleeve and said annular member and an oblique rib-and-groove connection with the other of said sleeves around the entire circumference thereof adapted to cause relative rotation of said other sleeve and said annular member when the latter is moved axially and means independent of the torque being transmitted for imparting such axial movement to said annular member, said means comprising a member mounted to slide axially of said sleeves and operatively connected with said annular member.

4. A rotary angularly adjustable coupling comprising inner and outer sleeves and an annular member interposed between and adjustable axially of said sleeves and operatively connected therewith to transmit rotary motion therebetween in all positions of its axial sliding movement, said annular member having at least four rib-and-slot connections with the outer sleeve permitting relative axial movement but preventing relative rotary movement of said outer sleeve and said annular member and an oblique rib-and-groove connection with the inner sleeve adapted to rotate said inner sleeve relative to said annular member and said outer sleeve when said annular member is moved axially and means independent of the torque being transmitted for imparting such axial movement to said annular member, said means comprising a member mounted for axial sliding movement on said outer sleeve and operatively connected with said annular member.

5. A rotary angularly adjustable coupling comprising two concentric sleeves and an annular member interposed between and slidable axially of said sleeves and operatively connected therewith to transmit rotary motion therebetween in all positions of its axial sliding movement, one of said sleeves having a series of circumferentially spaced elongated slots therein that extend parallel with the axis thereof and said annular member having a series of similarly spaced longitudinal ribs adapted to slidably engage the elongated slots in said sleeve, said annular member and the other sleeve having continuous series of interfitting ribs and grooves arranged obliquely to their longitudinal axes and adapted to impart relative rotary movement to said other sleeve and said annular member when the latter is moved axially of said sleeves and means independent of the torque being transmitted for imparting such axial movement to said annular member, said means comprising a member mounted for axial sliding movement on said first mentioned sleeve and having portions extending through the elongated slots therein and operatively connected with the cooperating ribs of said annular member.

6. A rotary angularly adjustable coupling comprising concentric inner and outer sleeves and an annular member interposed between and slidable axially of said sleeves and operatively connected therewith to transmit rotary motion therebetween in all positions of its axial sliding movement, said outer sleeve having a series of circumferentially spaced elongated slots therein that extend parallel with the axis thereof and said annular member having a series of similarly spaced longitudinal ribs on its outer periphery adapted to slidably engage the elongated slots in said outer sleeve, said annular member having a continuous series of circumferentially spaced obliquely disposed ribs on its inner periphery that engage a corresponding series of grooves on the outer periphery of said inner sleeve and are adapted to rotate said inner sleeve in said annular member when the latter is moved axially of said coupling and means independent of the torque being transmitted for imparting such axial movement to said annular member, said means comprising a member mounted for axial sliding movement on said outer sleeve and operatively connected with the ribs on the outer periphery of said annular member.

7. A rotary coupling comprising concentric inner and outer sleeves and an annular member interposed between said sleeves, said outer sleeve having a series of circumferentially spaced elongated slots therein that extend parallel with the axis thereof and said annular member having a series of correspondingly spaced longitudinal ribs on its outer periphery adapted to slidably engage the elongated slots in said outer sleeve, said annular member having a series of circumferentially spaced obliquely disposed ribs on its inner periphery adapted to engage a corresponding series of obliquely disposed grooves on the outer periphery of said inner sleeve, and an operating ring mounted for axial sliding movement on said outer sleeve and having a series of circumferentially spaced lugs on its inner periphery adapted to enter the respective slots in said outer sleeve and seat in transverse grooves provided therefor in the outer faces of the longitudinal lugs on the outer periphery of said annular member.

8. A rotary coupling comprising concentric inner and outer sleeves and an annular member interposed between and slidable axially of said sleeves, said outer sleeve having a series of elongated slots therein that extend parallel with the axis thereof and said annular member having a series of similarly spaced external ribs that slidably engage the elongated slots in said outer sleeve, said elongated slots opening through one end of said outer sleeve to facilitate endwise insertion and removal of said annular member through said end, said annular member and said inner sleeve having cooperating obliquely disposed ribs and grooves thereon, and an operating ring mounted for axial sliding movement on said outer sleeve and having a series of circumferentially spaced internal lugs that seat in transverse grooves provided therefor in the outer faces of the external ribs of said annular member.

9. A rotary coupling comprising concentric inner and outer sleeves and an annular member interposed between said sleeves, said outer sleeve having a series of elongated slots therein that extend parallel with the axis thereof and said annular member having a series of similarly spaced external ribs that slidably engage said elongated slots, said annular member and said inner sleeve having cooperating obliquely disposed ribs thereon and an operating ring mounted for axial sliding movement on said outer sleeve and having a series of circumferentially spaced internal lugs adapted to enter said elongated slots and seat in transverse grooves provided therefor in the outer faces of the external ribs of said annular member, said outer sleeve having an angular groove formed in the outer periphery thereof adjacent to one end of each of the elongated slots therein, one branch of said angular groove opening through one end of said outer sleeve and the other branch opening into an adjacent elongated slot, whereby said operating ring may be mounted on and dismounted from said outer sleeve by sliding the internal lugs of said ring through said angular grooves and said internal lugs, when disposed in or in register with the branches of said grooves that open into said elongated slots, may be engaged with and disengaged from the transverse grooves in the outer faces of the external ribs of said annular member by turning said operating ring on its axis.

10. In a rotary coupling, concentric inner and outer sleeves, a follower ring interposed between said sleeves and having a connection with said outer sleeve permitting relative axial movement but preventing relative rotary movement of said outer sleeve and said follower ring and a connection with said inner sleeve adapted to rotate said inner sleeve relative to said follower ring when the latter is moved axially, said outer sleeve having its bore enlarged at one end and the corresponding end of said inner sleeve having an outstanding flange that fits within the enlarged portion of said bore, said enlarged portion of said bore being provided with an annular groove, and a snap ring seated in said groove opposite the flanged end of said inner sleeve.

11. In a rotary coupling, concentric inner and outer sleeves, a follower ring interposed between said sleeves and having a connection with said outer sleeve permitting relative axial movement but preventing relative rotary movement of said outer sleeve and said follower ring and a connection with said inner sleeve adapted to rotate said inner sleeve relative to said follower ring when the latter is moved axially, said outer sleeve having its bore enlarged at one end and the corresponding end of said inner sleeve having an outstanding flange that fits within the enlarged portion of said bore, said enlarged portion of said bore being provided with an annular groove, a snap ring seated in said groove opposite the flanged end of said inner sleeve, a shaft having a threaded end portion and a conical portion adjacent thereto, one end of the bore of said inner sleeve having a conical portion adapted to seat on the conical portion of said shaft, a nut extending into the other end of said sleeve and threaded on the threaded end of said shaft with its inner end in abutting relation to the annular shoulder in said bore, and an oil retaining ring mounted on said nut in cooperative relation to the wall of said bore.

HERBERT C. EDWARDS.